US008013827B2

(12) United States Patent
Kageyama et al.

(10) Patent No.: US 8,013,827 B2
(45) Date of Patent: Sep. 6, 2011

(54) IMAGE DISPLAY DEVICE

(75) Inventors: Hiroshi Kageyama, Hachioji (JP); Katsumi Matsumoto, Mobara (JP)

(73) Assignee: Hitachi Displays, Ltd, Chiba-ken (JP)

( * ) Notice: Subject to any disclaimer, the term of this patent is extended or adjusted under 35 U.S.C. 154(b) by 1082 days.

(21) Appl. No.: 11/806,194

(22) Filed: May 30, 2007

(65) Prior Publication Data

US 2007/0279366 A1 Dec. 6, 2007

(30) Foreign Application Priority Data

May 31, 2006 (JP) ................................ 2006-151728

(51) Int. Cl.
*G09G 3/36* (2006.01)
*G09G 5/00* (2006.01)
*G06F 3/038* (2006.01)

(52) U.S. Cl. ............ 345/100; 345/98; 345/99; 345/204

(58) Field of Classification Search .................. 345/100, 345/204
See application file for complete search history.

(56) References Cited

U.S. PATENT DOCUMENTS 6,127,899 A * 10/2000 Silva et al. ..................... 331/78
7,116,307 B2 10/2006 Toyozawa et al.
7,659,877 B2 * 2/2010 Murakami et al. ............ 345/100
2002/0054009 A1 * 5/2002 Koyama et al. ............... 345/100
2004/0041777 A1 * 3/2004 Toyozawa et al. ............ 345/100

FOREIGN PATENT DOCUMENTS

JP 08-194205 1/1995
JP 08-286170 2/1996
WO WO 03/036606 5/2003

* cited by examiner

*Primary Examiner* — Alexander S Beck
*Assistant Examiner* — Charles Hicks
(74) *Attorney, Agent, or Firm* — Stites & Harbison PLLC; Juan Carlos A. Marquez, Esq.

(57) ABSTRACT

The present invention provides an image display device that is capable of reducing the power consumption. The total power consumption of a level shifter is reduced by using a pulse of an oscillator circuit as an enable signal of a level shifter for amplifying the enable signal to be supplied to a group of level shifters. The image display device includes an oscillator circuit, a first level shifter, and a plurality of second level shifters, which are mounted on a substrate and formed with thin-film transistors. The plurality of second level shifters each has a shutdown function for reducing the power consumption of the level shifters. The shutdown function of the first level shifter is controlled by an output pulse of the oscillator circuit. The shutdown function of the group of second level shifters is controlled by an output pulse of the first level shifter.

10 Claims, 11 Drawing Sheets

IMAGE DISPLAY DEVICE

CLAIM OF PRIORITY

The present application claims priority from Japanese application JP 2006-151728 filed on May 31, 2006, the content of which is hereby incorporated by reference into this application.

BACKGROUND OF THE INVENTION

1. Field of the Invention

The present invention relates to an image display device and its drive circuit, and more particularly to a liquid-crystal display device and its drive circuit.

2. Description of the Related Art

An active matrix display, which is represented by an active matrix liquid-crystal display, forms a thin-film transistor (hereinafter referred to as the TFT) for each pixel, and stores display information in each pixel to display an image. A polysilicon TFT is formed by using a polysilicon film that is polycrystallized by laser-annealing an amorphous silicon film to raise the mobility to approximately 100 $cm^2/V\text{-}s$. A circuit composed of a polysilicon TFT operates from a signal having a frequency of up to several megahertz to several tens of megahertz. Therefore, not only pixels but also drive circuits such as a data driver for generating a video signal and a gate driver for performing a scan can be formed in the same process as for a TFT that composes a pixel on a substrate for a liquid-crystal display device or the like.

A transmissive liquid-crystal display displays an image by controlling the transmissivity of the light transmitted through a backlight. On the other hand, a reflective liquid-crystal display has a reflective electrode within a pixel to reflect extraneous light and displays an image by controlling the reflectivity of sunlight and room illumination light incident on the pixel. Therefore, the reflective liquid-crystal display does not require the backlight.

A liquid-crystal display having both the transmission function and reflection function is called a semi-transmissive liquid-crystal display. The reflective liquid-crystal display and the semi-transmissive liquid-crystal display whose backlight is extinguished generally consume considerably less power than the transmissive liquid-crystal display, which needs to illuminate the backlight.

A liquid-crystal display having a built-in pixel memory is extremely low in power consumption. A normal liquid-crystal display having no built-in pixel memory temporarily retains an electrical charge in a capacitor within a pixel to keep the voltage to be applied to a liquid crystal. Therefore, even when a still picture is to be displayed, the normal liquid-crystal display having no built-in pixel memory needs to periodically refresh the voltage.

Consequently, even when a motion picture or still picture is displayed, a data line for transferring a data signal to a pixel needs to be constantly driven at several tens of kilohertz. Therefore, a considerable amount of power is consumed by the data line and a data driver for driving the data line. The liquid-crystal display having a built-in pixel memory, which is mainly designed for displaying a still picture, has a static memory in each pixel. Therefore, when displaying a still picture, the liquid-crystal display having a built-in pixel memory does not have to perform a refresh operation. Consequently, it is possible to completely save the power to be consumed by the data line and data driver.

FIG. 12 shows the configuration of a conventional display having a built-in memory. Pixel circuits 102, which use a thin-film transistor, are mounted on a glass substrate 101 and arranged in a matrix form. For the sake of brevity, FIG. 12 shows 2 (V)×2 (H) pixel circuits 102. In reality, however, the number of rows and the number of columns are generally larger than 100.

Each pixel circuit 102 includes a static memory 104 and a selector 105. The static memory 104 samples an image signal from the data line in synchronism with a scanning pulse from a gate line. The selector 105 applies to a display section liquid-crystal element LC an AC voltage that corresponds to the information stored in the static memory 104. Further, an oscillator circuit (OSC) 103 and a buffer circuit 108, which are made of a thin-film transistor, are mounted on the glass substrate 101. The oscillator circuit 103 and buffer circuit 108 supply AC voltages VLCa and VLCb to all pixel circuits 102. Voltages VLCa and VLCb are square-wave voltages that normally have a frequency of 30 to 60 Hz, and in opposite phase to each other.

A gate input G of the static memory 104 is connected to gate lines GL1, GL2. A data input D of the static memory 104 is connected to data lines DL1, DL2. A data driver 106 is connected to the data lines DL1, DL2. A gate driver 107 is connected to the gate lines GL1, GL2.

An image signal is serially input (Sig_IN) into the data driver 106 from the outside of the display. The data driver 106 can temporarily store the input image signal and parallelly output it to the data lines DL1, DL2. The gate driver 107 sequentially outputs to the gate lines GL1, GL2 the pulses synchronized with the signal timing of the outputs DL1, DL2 of the data driver 106, thereby specifying a horizontal row of pixel circuits 102 into which the image signal developed in the data lines DL1, DL2 should be written.

The static memory 104 uses the scanning pulse supplied to the gate line to be connected to read the image signal of the data line to be connected. The selector 105 selects supplied square-wave voltage VLCa or VLCb in accordance with a one-bit storage state in the static memory, and supplies the selected square-wave voltage to the liquid-crystal element LC.

For example, it is assumed that a liquid crystal for giving a normally white screen (giving a white screen when the applied AC voltage is low) and an optical structure necessary for giving a normally white screen are used.

When the selector 105 selects voltage VLCa, voltages of the same phase are applied to two electrodes that sandwich the liquid-crystal element LC. Therefore, the applied AC voltage is 0 V so that the liquid-crystal element LC gives a white screen. On the contrary, when the selector 105 selects voltage VLCb, voltages in opposite phase to each other are applied to the two electrodes that sandwich the liquid-crystal element LC. Therefore, a raised AC voltage is applied so as to give a black screen. The liquid-crystal display having a built-in memory is described in more detail in JP-A-1996-194205 and JP-A-1996-286170.

The status (white or black) of each pixel can be determined by the storage state of the static memory 104. Therefore, while a still picture, which does not require an image refresh, is displayed, the operations of the data driver 106 and gate driver 107 can be stopped. This makes it possible to save the entire drive circuit power consumption for driving the data lines DL1, DL2 and gate lines GL1, GL2. Consequently, the liquid-crystal display having a built-in memory can substantially reduce the power consumption for a still picture display period unlike a normal liquid-crystal display.

Meanwhile, the power supply voltage for a circuit formed with a thin-film transistor is generally higher than that for an LSI or other circuit formed with monocrystalline silicon.

Therefore, it may be necessary in some cases that a plurality of thin-film-transistor-based level shifters (LS) 109 be mounted on the glass substrate 101. The level shifters 109 voltage-amplify a small-amplitude voltage signal, which is supplied from an LSI that is positioned outside an image display, to a large-amplitude voltage signal, and supply drive signals to the data driver 106 and gate driver 107.

FIG. 13 shows a level shifter having a shutdown function. A grounded-gate amplifier circuit is formed by an n-channel TFT 111 and a load resistor 112. The symbol VDD represents a plus side power supply. An enable signal ENB for controlling the ON/OFF status of the TFT 111 enters a gate for the TFT 111. If the enable signal ENB has a voltage that is high enough to turn ON the TFT 111, a drain current adequate for performing a voltage amplification operation flows to the TFT 111. Therefore, a small-amplitude signal L-Sig is amplified to a large-amplitude signal Sig.

If, on the other hand, the enable signal ENB has a voltage that is low enough to turn OFF the TFT 111, the drain current flow to the TFT 111 is virtually zero. Therefore, the level shifter shown in FIG. 13 does not perform an amplification operation and reduces the power consumption to virtually zero. In other words, the level shifter shuts down.

FIG. 14 shows a conventional circuit configuration of a group of hierarchical level shifters. The output of a constantly operating level shifter (LS') 121 is connected to enable inputs of the group of the level shifters 122. The level shifter 121 amplifies an input small-amplitude enable signal L-ENB to a large-amplitude enable signal ENB. The large-amplitude enable signal ENB determines the operating status/shutdown status of the group of level shifters 122. If the enable signal ENB is valid, the group of level shifters 122 amplifies small-amplitude signals L-Sig1 to L-Sig5 to large-amplitude signals Sig1 to Sig5. If, on the other hand, the enable signal ENB is not valid, the group of level shifters 122 stops their amplification operations. This configuration ensures that the small-amplitude enable signal L-ENB shuts down the group of level shifters 122 when the group of level shifters 122 need not be operated. Therefore, the power consumption of the group of level shifters 122 can be reduced. The circuit configuration of the group of hierarchical level shifters, which has been described above, is described in more detail in International Publication No. WO03/036606.

SUMMARY OF THE INVENTION

When an apparatus in which an image display device is mounted is to be driven by battery power, it is preferred that the power consumption of the image display device be small. In a display having a built-in memory, which features low power consumption, it is particularly important that the power consumption of the level shifters 109 be reduced. If, in the conventional liquid-crystal display having a built-in memory, which is shown in FIG. 12, the static memory 104 retains information while the image display device displays a still picture, the data driver 106 and gate driver 107 are stopped. Therefore, the level shifters 109 should be all shut down to reduce the power consumption.

The power consumption of the level shifter having a shutdown function, which is shown in FIG. 13, can be reduced to virtually zero when the TFT 111 turns OFF in accordance with the enable signal ENB to cut the drain current. To exercise ON/OFF control over the TFT 111, however, it is necessary that the enable signal ENB be a signal having large amplitude.

FIG. 15 is a schematic diagram that briefly illustrates the relationship between the gate voltage Vgs and drain current Id of a TFT. Three different states prevail depending on the gate voltage Vgs. When the gate voltage Vgs is low, the resulting state is a blocking region (a). When the gate voltage Vgs is high, the resulting state is an overthreshold region (c). When the gate voltage Vgs is intermediate between low and high, the resulting state is a subthreshold region (b). In the blocking region (a), the drain current Id is close to zero. In the overthreshold region (c), a relatively large drain current Id flows in proportion to the drain-source voltage. In the subthreshold region (b), which represents a period of transition between the first two regions, the drain current Id exponentially increases with an increase in the gate voltage Vgs. To permit the TFT 111 to turn ON and OFF, the voltage amplitude of the enable signal ENB needs to be such that the gate voltage Vgs has a large amplitude A and invokes a change between the blocking region (a) and overthreshold region (c).

In general, the subthreshold region of a thin-film transistor is approximately 3 V and several times higher than that of a monocrystalline silicon transistor. The enable signal ENB needs to have an amplitude of higher than 3 V. Therefore, when an enable signal having an amplitude of lower than 3 V is supplied to the image display device, a level shifter needs to be furnished to amplify the enable signal to a large-amplitude signal.

FIG. 14 shows a level shifter 121 that amplifies a small-amplitude enable signal L-ENB to a large-amplitude enable signal ENB. The enable signal ENB amplified by the level shifter 121 provides shutdown control over the group of level shifters 122. However, although the group of level shifters 122 can be shut down by the L-ENB signal, the level shifter 121 must constantly operate. It means that the level shifter 121 incessantly consumes power.

It is an object of the present invention to provide an image display device that is capable of shutting down all level shifters to reduce the total power consumption.

According to a typical aspect of the present invention, there is provided an image display device that includes a plurality of pixel circuits, which are mounted on a substrate, formed with a thin-film transistor, and arranged in a matrix form; a plurality of data lines, which transmit an image signal to the plurality of pixel circuits; a plurality of gate lines, which intersect with the data lines and transmit a scanning pulse to the plurality of pixel circuits; and a drive circuit, which drive the data lines and the gate lines. The image display device comprising: an oscillator circuit that is mounted on the substrate and formed with a thin-film transistor; and a plurality of level shifters that are formed with a thin-film transistor, wherein the plurality of level shifters each have a shutdown function for reducing the power consumption of the level shifters; wherein the plurality of level shifters include a first level shifter and a group of second level shifters; wherein the shutdown function of the first level shifter is controlled by an output pulse of the oscillator circuit; and wherein the shutdown function of the group of second level shifters is controlled by an output signal of the first level shifter.

Since a pulse of the oscillator circuit is used as an enable signal for a level shifter that amplifies the enable signal to be supplied to the group of level shifters, the total power consumption of the level shifters can be reduced. As the power consumption required for a pixel circuit refresh can be reduced, the power consumption of the image display device can be effectively reduced. The effect of power consumption reduction can be readily produced particularly for reflective liquid-crystal displays, semi-transmissive liquid-crystal displays, and other image display devices in which power is mostly consumed for circuit operations. Further, the power consumption of an electronic device that includes the image display device according to the present invention can be reduced to increase the operating time of an employed battery.

DETAILED DESCRIPTION OF THE PREFERRED EMBODIMENT

A preferred embodiment of the present invention will now be described in detail with reference to the accompanying drawings.

Figure 1:
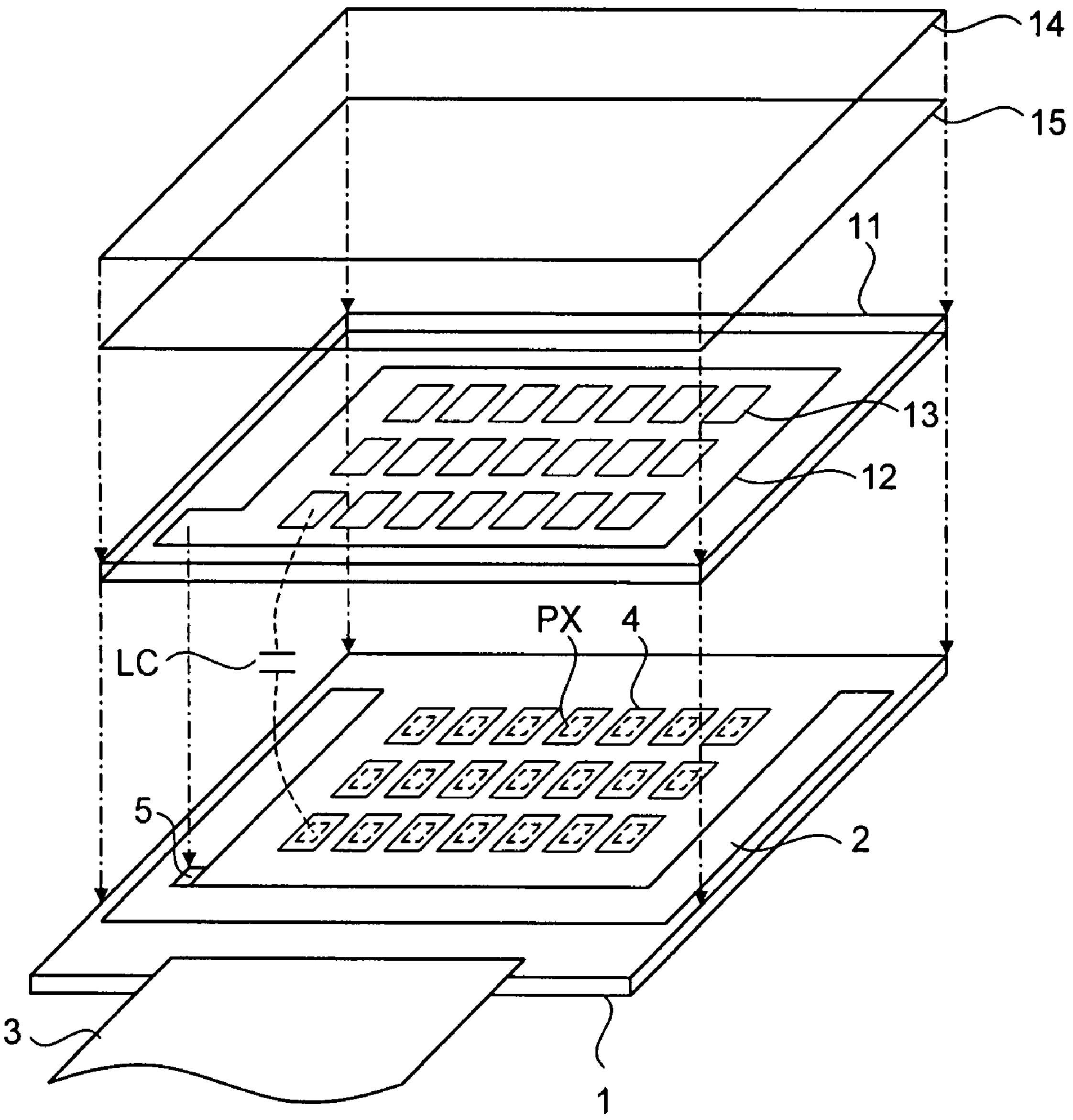
FIG. 1 is an exploded perspective view illustrating the structure of an image display device according to an embodiment of the present invention.

FIG. 1 is an exploded perspective view illustrating the structure of an image display device according to an embodiment of the present invention. Pixel circuits PX are formed with a TFT, mounted on the surface of a glass substrate 1, and arranged in a matrix form. A drive circuit 2, which is formed with a TFT, is positioned around the pixel circuits PX. The glass substrate 1 is a substrate that is generally used in a low-temperature polysilicon manufacturing process. However, the material of the substrate is not limited to glass. The substrate may be made of a material other than glass as far as it provides adequate surface insulation. A film substrate 3 is attached to the glass substrate 1. An external voltage signal and a voltage required for drive circuit operations are supplied through the film substrate 3.

A display electrode 4 is formed so as to cover each pixel circuit PX. The display electrode 4 is connected to an output of the pixel circuit PX. The glass substrate 1 is attached to another glass substrate 11 with a several micron thick liquid-crystal material (not shown) sandwiched between these two glass substrates. The thickness of the liquid-crystal material can be maintained uniform by spreading spherical beads (not shown) on the glass substrate 1. A transparent electrode 12 is formed on the lower surface of the glass substrate 11. A liquid-crystal element LC is formed by causing the liquid crystal to be sandwiched between the transparent electrode 12 and the display electrode 4 for each pixel circuit PX. When the transparent electrode 12 is connected to a connection terminal 5 that is mounted on the glass substrate 1, a voltage is supplied from the drive circuit 2 to the transparent electrode 12. Further, a voltage developed between the transparent electrode 12 and display electrode 4 is applied to the liquid-crystal element LC, which is sandwiched between the transparent electrode 12 and display electrode 4.

There are openings 13 in the inner surface of the glass substrate 11. The openings 13 coincide with the display electrodes 4 when the glass substrate 11 is attached to the glass substrate 1. A light-shielding layer is formed on an area other than the openings 13 so that light does not travel through the area other than the openings 13. The display electrodes 4 are made of metal such as aluminum. They reflect light that travels downward through the openings 13. Further, when the openings 13 are provided with red, green, and blue color filters (not shown), the image display device is capable of displaying a color image. A polarization film 14 and a retardation film 15 are attached to a surface of the glass substrate 11 that is positioned opposite the glass substrate 1. When AC voltages having different amplitudes are applied to the liquid-crystal element LC, the polarization film 14 and retardation film 15 function so that the light reflectivity ratio greatly varies to produce bright and dark visible spots.

Figure 2:
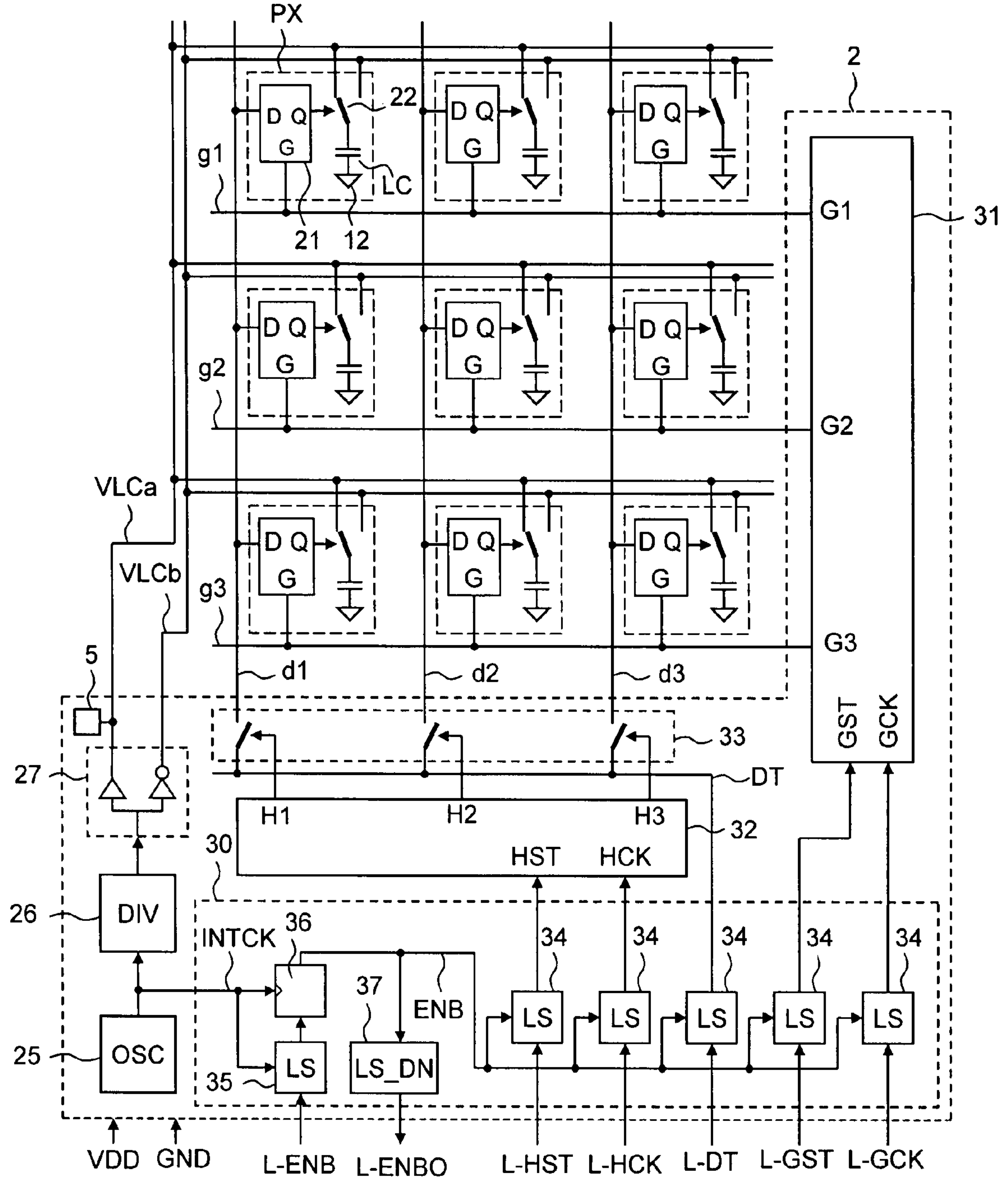
FIG. 2 shows the configurations of pixel circuits and drive circuit that are formed on a glass substrate.

FIG. 2 shows the configurations of the pixel circuits and drive circuit that are formed on the glass substrate 1. The pixel circuits PX are arranged in a matrix form. A plurality of data lines d1-d3 are positioned to interconnect the pixel circuits PX in a vertical direction in the figure, and a plurality of gate lines g1-g3 are wired to interconnect the pixel circuits PX in a horizontal direction in the figure. For the sake of brevity, FIG. 2 shows three data lines, three gate lines, and nine (3×3) pixel circuits PX. In reality, however, an actual image display device has more than several hundred lines in both the vertical and horizontal directions. If, for instance, the image display device is a color image display device having a VGA resolution, it has 1920 (640×3) data lines (three colors; red, green, and blue), 480 gate lines, and 921600 (640×3×480) pixel circuits PX.

Each pixel circuit PX includes a static memory 21 and a selector 22. The static memory 21 stores image data, which is supplied through a data line, in synchronism with a scanning pulse, which is supplied through a gate line. The selector 22 applies an AC voltage to the liquid-crystal element LC of a display section in accordance with the data stored in the static memory 21.

The display electrode 4 (not shown in FIG. 2) is used as one electrode for the liquid-crystal element LC to which the selector 22 is connected. The transparent electrode 12 is used as the other electrode for the liquid-crystal element LC.

The drive circuit 2 includes an oscillator circuit (OSC) 25, a frequency divider circuit (DIV) 26, a buffer amplifier 27, shift registers 31, 32, a sampling circuit 33, and a level shifter circuit 30. The shift register 31 corresponds to a gate driver circuit of a common liquid-crystal display. The shift register 32 and sampling circuit 33 correspond to a data driver circuit of a common liquid-crystal display. The output signal of the oscillator circuit 25 is supplied to the frequency divider circuit 26, a level shifter 35, and a latch 36. The signal INTCK is a pulse waveform having a fixed period. The frequency divider circuit 26 frequency-divides the signal INTCK, and supplies to the buffer amplifier 27 a square wave having a period that is an integer multiple of the period of the signal INTCK. The buffer amplifier 27 generates square waves VLCa, VLCb, which are in opposite phase to each other, and supplies them to all pixel circuits PX. The square-wave voltage VLCa is also supplied to the transparent electrode 12 through the connection terminal 5.

The level shifter circuit 30 includes a group of level shifters 34, a level shifter 35, a latch 36, and a level shifter (LS_DN) 37. The group of level shifters 34 amplify the amplitudes of small-amplitude signals L-GST, L-GCK, L-HST, L-HCK, L-DT that are input to the image display device, and supply large-amplitude signals to the shift registers 31, 32 and sampling circuit 33.

The shift register 31 inputs GST and GCK signals and outputs a scanning pulse to the gate lines g1-g3. The shift register 32 inputs HST and HCK signals, sequentially outputs sampling pulses to the sampling circuit 33. In synchronism with the sampling pulses, the sampling circuit 33 samples signal data, which is an image signal, in relation to the data lines. The level shifter 35 amplifies a small-amplitude signal L-ENB and supplies the amplified signal to the latch 36. The output of the latch 36 is supplied to the group of level shifters 34 as large-amplitude ENB signal. The ENB signal supplied in this manner controls the shutdown function of the group of level shifters 34.

The output signal INTCK of the oscillator circuit 25 is supplied to the level shifter 35 to control the shutdown function of the level shifter 35. The ENB signal is attenuated to a small-amplitude signal by the level shifter 37 and output as an L-ENBO signal. A plus power supply voltage VDD and a minus ground voltage GND (0 V) are supplied from the outside of the image display device as power supply voltages for the drive circuit 2 and pixel circuits PX.

Figure 3:
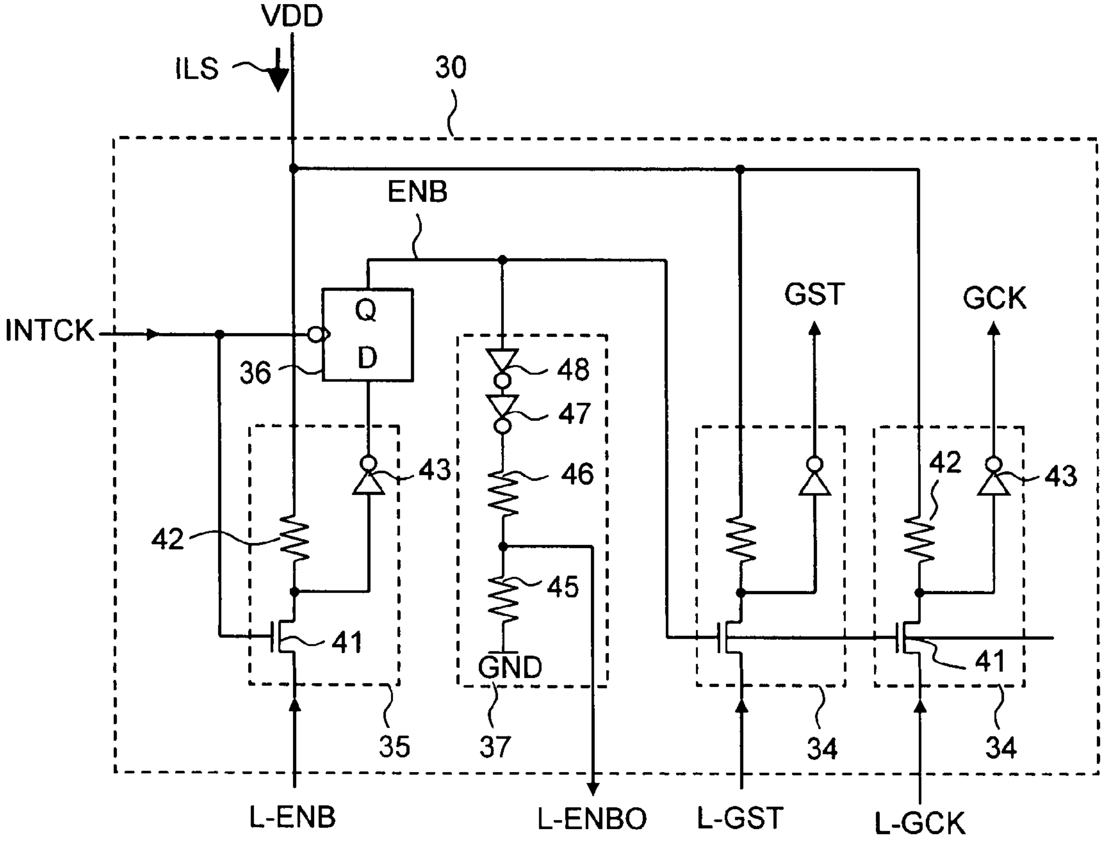
FIG. 3 is a circuit diagram that shows the details of a level shifter circuit.

FIG. 3 is a circuit diagram that shows the details of the level shifter circuit 30. The group of level shifters 34 and the level shifter 35 include a grounded-gate amplifier circuit, which is composed of a TFT 41 and a resistive wiring 42, and an inverter 43. Only the circuit configurations of level shifters for amplifying the L-GST and L-GCK signals are indicated in the figure as representatives of the group of level shifters 34. However, the remaining level shifters, which are connected in parallel with the above level shifters, have the same circuit configuration as the above level shifters.

The latch 36 is made of a negative edge trigger type D flip-flop. It latches an input D signal when the output signal INTCK of the oscillator circuit 25 falls, and ensures that an input D value is reflected in signal ENB. The level shifter 37 includes inverters 47, 48 and resistive wirings 45, 46. It attenuates signal ENB, which is a large-amplitude signal, to signal L-ENBO, which is a small-amplitude signal, and outputs the attenuated signal.

Figure 4:
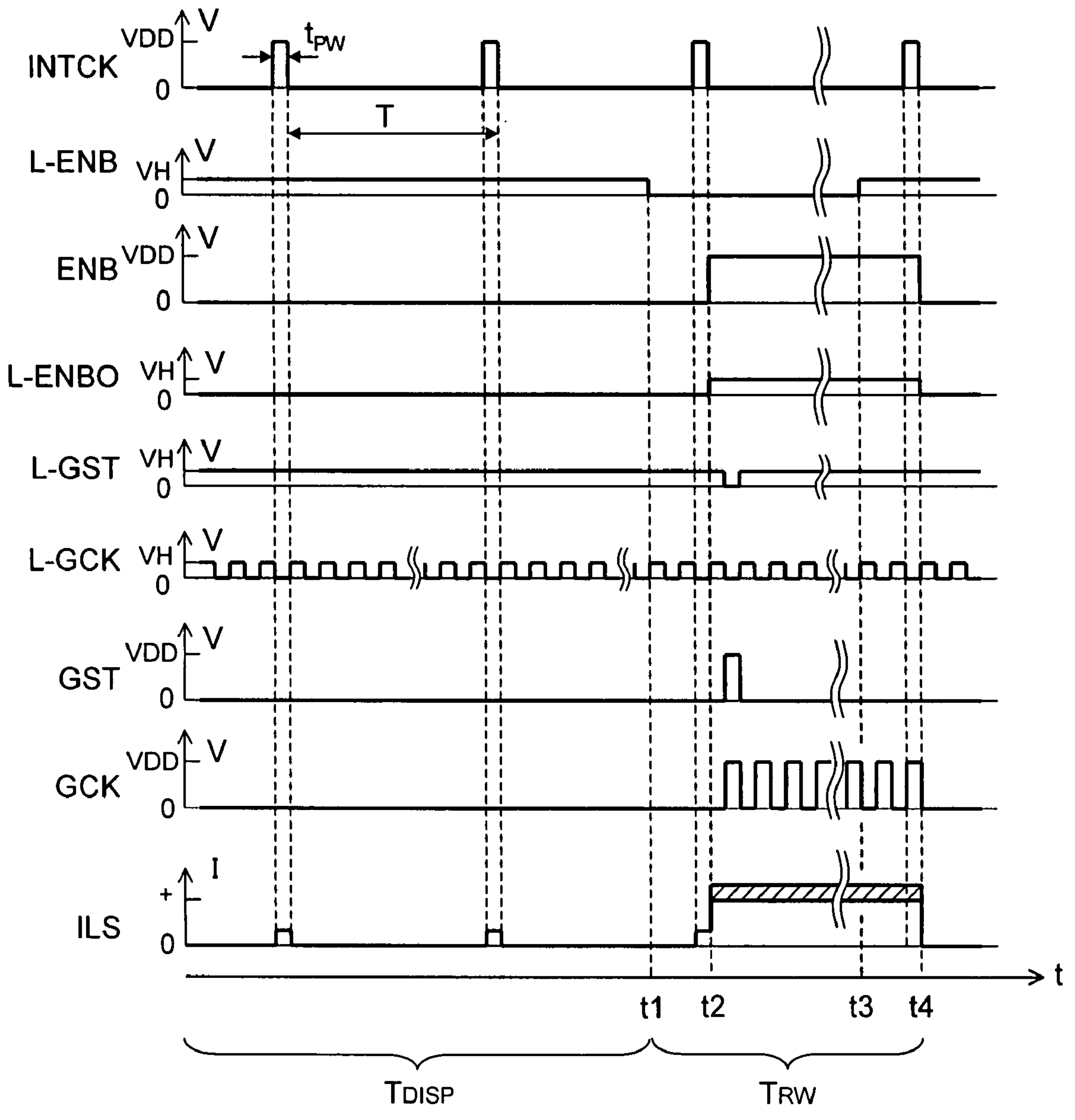
FIG. 4 shows operating waveforms of the level shifter circuit shown in FIG. 3.

FIG. 4 shows operating waveforms of the level shifter circuit shown in FIG. 3. A High-level voltage that is a large-amplitude signal is indicated as the power supply voltage VDD for the drive circuit, and a High-level voltage that is a small-amplitude signal is indicated as voltage VH (0 V<VH<VDD). Signal INTCK is a pulse waveform indicating that a pulse having a pulse width of $t_{pw}$, which is generated by the oscillator circuit 25, appears in a cycle of T.

A still picture display period $T_{DISP}$ of the image display device is determined by signal L-ENB. The still picture display period prevails while signal L-ENB is maintained at High-level voltage VH. When a pulse appears in signal INTCK while signal L-ENB is voltage VH, the level shifter 35 voltage-amplifies signal L-ENB. When the pulse of signal INTCK falls, the latch 36 stores it and a voltage of 0 V is output as signal ENB. While signal INTCK is at 0 V, the latch 36 maintains the ENB state and the TFTs 41 in the group of level shifters 34 are OFF. Therefore, the power consumption of the group of level shifters 34 is virtually zero.

During an image rewrite period $T_{RW}$, during which the image display device rewrites an image, signal L-ENB is set at 0 V at first (time t1). When signal INTCK falls for the first time after signal L-ENB was set at 0 V, signal ENB is set at voltage VDD (time t2). The TFTs 41 in the group of level shifters 34 then turn ON. Thus, the group of level shifters 34 is ready for an amplification operation. Simultaneously, voltage VDD of signal ENB is attenuated by the level shifter circuit 37 so that voltage VH is output as signal L-ENBO. This operation notifies the outside of the image display device that the group of level shifters 34 is ready for an amplification operation. When the signals L-GST, L-GCK, L-HST, L-HCK, L-DT for driving the shift registers 31, 32 and sampling circuit 33 are input after signal L-ENBO was set at voltage VH, the group of level shifters 34 amplify the input signals to signals GST, GCK, HST, HCK, and DT.

FIG. 4 shows only the waveforms of signals L-GST, L-GCK, GST, and GCK as representatives of signals that are level-shifted from a small-amplitude signal to a large-amplitude signal. For example, even if only the signals input to the group of level shifters 34 while signal L-ENBO is at voltage VH are voltage-amplified and a signal is input while signal L-ENBO is at 0 V as in an L-GCK waveform, voltage amplification does not take place during such a period.

When the rewrite operation is terminated to return to the still picture display period, L-ENB is set at voltage VH (time t3). Signal ENB is then set at 0 V when the first pulse of signal INTCK falls (time t4). This turns OFF the TFTs 41 in the group of level shifters 34. Therefore, the power consumed by the group of level shifters 34 is zero.

During the image rewrite period $T_{RW}$, power supply current ILS, which is supplied from power supply VDD to the level shifter circuit 30, flows in an increased amount due to the amplification operation by the group of level shifters 34. During the still picture display period $T_{DISP}$, on the other hand, no electrical current is consumed by the group of level shifters 34 because the group of level shifters 34 is shut down. The level shifter 35 consumes an electrical current during period $t_{PW}$ to perform an amplification operation, but consumes no electrical current during the other period. During the still picture display period during which a decrease in the electrical current consumption is demanded, therefore, the electrical current consumption of the level shifter 35 is $t_{PW}/T$ times the electrical current consumption during a continuous operation. Consequently, the electrical current consumption of the level shifter 35 decreases with a decrease in period $t_{PW}$. When, for instance, T=1 ms and $t_{PW}$=1 μs, the electrical current consumption of the level shifter 35 is 1/1000 the electrical current consumption during a continuous operation.

Figure 5:
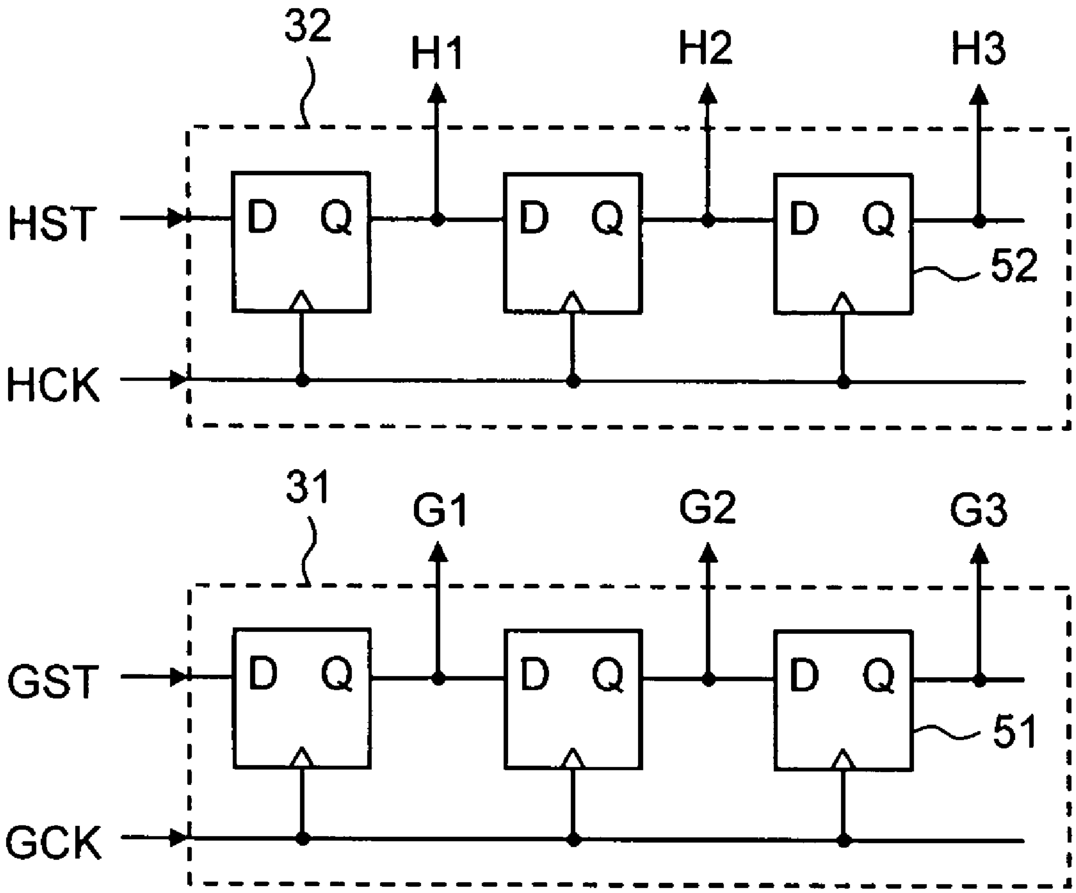
FIG. 5 shows circuit diagrams of shift registers.

FIG. 5 shows circuit diagrams of the shift registers 31, 32. The shift register 31 is formed by series-connecting positive edge trigger type D flip-flops 51, the number of which is equal to that of outputs G1-G3. The shift register 32 is also formed by series-connecting positive edge trigger type D flip-flops 52, the number of which is equal to that of outputs H1-H3.

Figure 6:
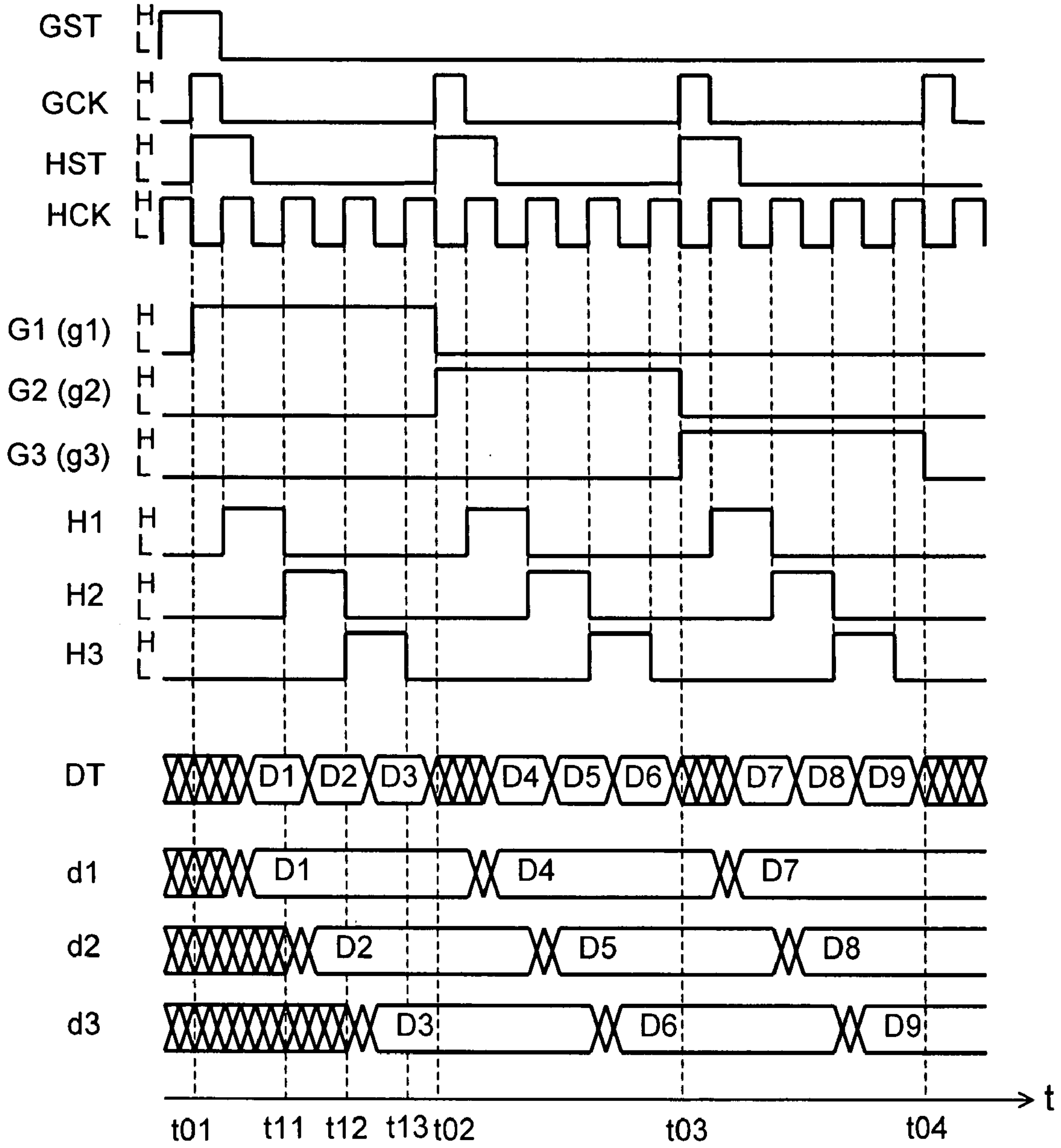
FIG. 6 shows operating waveforms of signals that are shown in FIG. 2 and related to an image rewrite operation.

FIG. 6 relates to the signals shown in FIG. 2 and shows operating waveforms related to an image rewrite operation. The symbol "H" denotes a High-level (voltage VDD) state, whereas the symbol "L" denotes a Low-level (0 V) state. Operations based on these waveforms are depicted on the assumption that the group of level shifters 34 are ready for amplification operations due to the operating waveforms shown in FIG. 4.

As regards signal DT, binary digital data D1-D9 are sequentially arranged. These binary digital data correlate to the 3×3 pixel circuits PX that are arranged in a matrix form as indicated in FIG. 2. When a clock waveform and a start pulse are input to inputs HCK and HST of the shift register 32, respectively, in synchronism with data D1 to D9 of signal DT, pulses are sequentially generated at outputs H1 to H3 of the shift register 32. Further, when a clock waveform and a start pulse are input to inputs GCK and GST of the shift register 31, respectively, in synchronism with a signal input to HST, pulses having the same duration as the period of the start pulse for signal HST are sequentially generated at outputs G1 to G3 of the shift register 31.

At time t01, gate line g1 goes High, and the static memories 21 of the pixel circuits PX in the uppermost line in FIG. 2 start reading the voltages of the data lines connected to the static memories 21.

The pulses at outputs H1 to H3 cause the sampling circuit 33 to sample data D1 to D3 in relation to the data lines d1-d3 (time t11, time t12, and time t13). The sampled data D1-D3 are retained even after sampling due to the parasitic capacitance of the data lines d1-d3.

At time t02, gate line g1 goes Low, and the states of the static memories 21 of the pixel circuits PX in the uppermost line in FIG. 2 are finalized as the values of data D1 to D3. At time t02, gate line g2 goes high and the static memories 21 of the pixel circuits PX in the middle line in FIG. 2 start reading the voltages of the data lines connected to the static memories 21.

At time t03, the sampling circuit 33 performs the same operation as described above so that the states of the static memories 21 of the pixel circuits PX in the middle line in FIG. 2 are finalized as the values of data D4 to D6.

At time t04, the same operation is performed so that the states of the static memories 21 of the pixel circuits PX in the lowermost line in FIG. 2 are finalized as the values of data D7 to D9.

The states of the static memories in all pixel circuits PX are rewritten by the above operations. Subsequently, the operating waveforms shown in FIG. 4 cause the image display device to switch to the still picture display period $T_{DISP}$ during which the power consumption is reduced.

Figure 7:
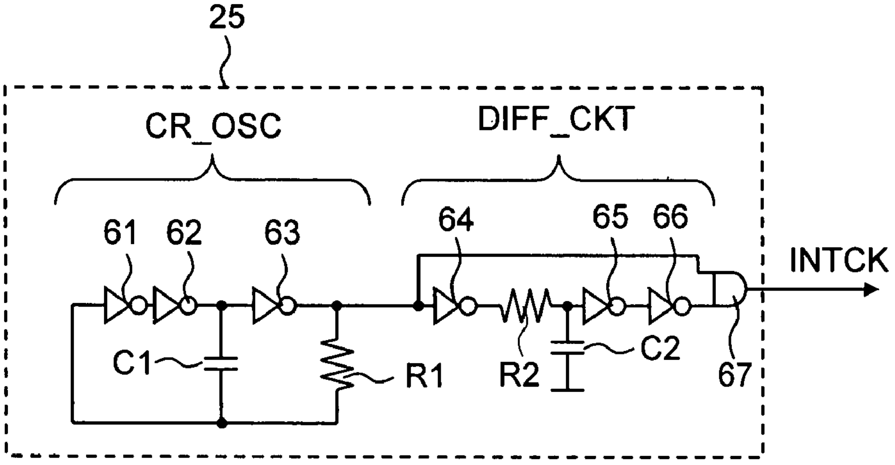
FIG. 7 is a circuit diagram illustrating an oscillator circuit.

FIG. 7 is a circuit diagram illustrating the oscillator circuit 25. The oscillator circuit 25 includes a CR oscillator circuit (CR_OSC) and a differentiation circuit (DIFF_CKT). The CR oscillator circuit includes inverters 61-63, a capacitor C1, and a resistor R1. The differentiation circuit includes inverters 64-66, an AND gate 67, a capacitor C2, and a resistor R2. The CR oscillator circuit generates a square wave having a period of T. The differentiation circuit converts the square wave to a pulse wave having a period of T and a pulse width of tPW, and outputs the pulse wave to INTCK.

The period T≈2.2×C1×R1, and the pulse width tPW≈C2×R2. When, for instance, C1, R1, C2, and R2 are set so that C1×R1=450×C2×R2, a pulse waveform having a pulse width tPW of approximately 1/1000T is generated at the INTCK output. If, for instance, C1=10 pF, R1=45 MΩ, C2=1 pF, and R2=1 MΩ, a pulse waveform having a period T of approximately 1 ms and a pulse width tPW of approximately 1 μs is generated at the INTCK output.

Figure 8:
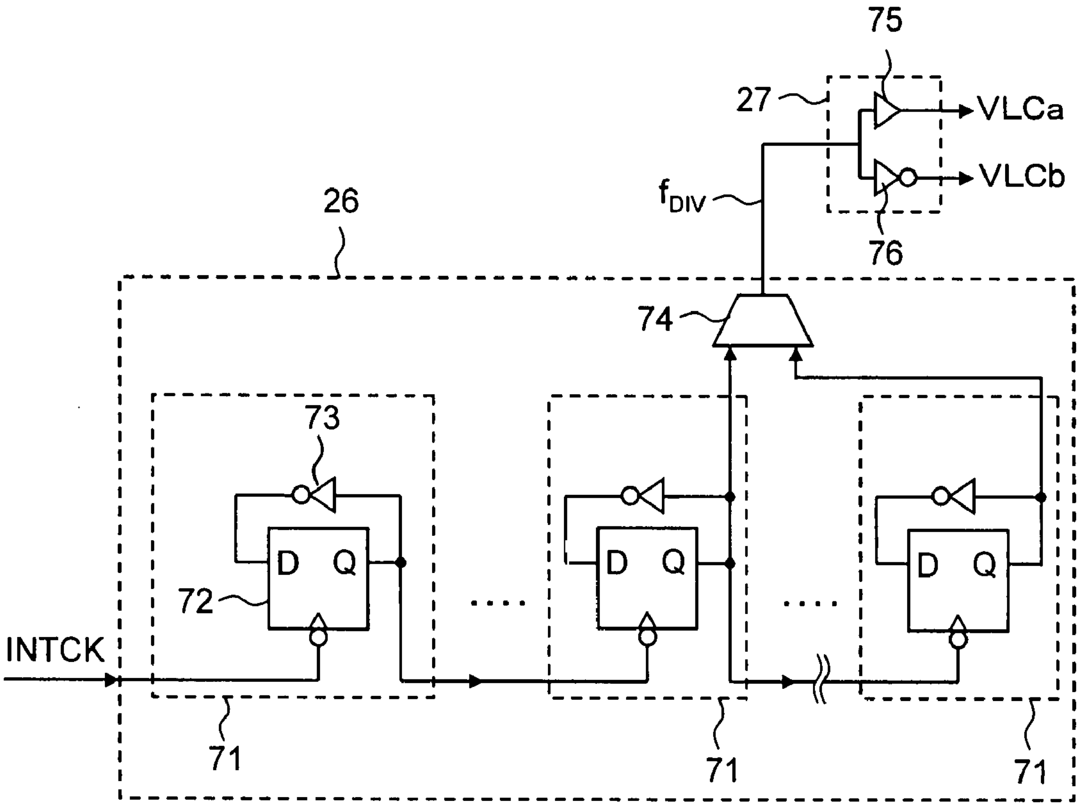
FIG. 8 is a circuit diagram illustrating a frequency divider circuit and a buffer amplifier.

FIG. 8 is a circuit diagram illustrating the frequency divider circuit 26 and the buffer amplifier 27. The buffer amplifier 27 includes a buffer 75 and an inverter 76. The frequency divider circuit 26 is formed by a plurality of series-connected divide-by-two circuits 71. Each divide-by-two circuit includes a negative edge trigger type D flip-flop 72 and an inverter 73. When a signal is input to a divide-by-two circuit 71, the divide-by-two circuit 71 outputs a signal having two times the period of the input signal. Therefore, n series-connected divide-by-two circuits 71 frequency-divide input signal INTCK and generate a square wave having a period that is equal to the nth power of 2 of the period T of INTCK.

If, for instance, the period T=1 ms and n=5, the frequency $f_{DIV}$ of the frequency-divided signal is 31.25 Hz. This frequency is appropriate for voltages VLCa and VLCb, which are employed to use an AC current for liquid crystal. When the frequencies $f_{LC}$ of liquid-crystal AC voltages VLCa and VLCb are to be further decreased for power consumption reduction, it is possible to increase the number of divide-by-two circuits 71, furnish a selector 74, and selectively output a frequency of a square wave whose period differs depending on the purpose.

Figure 9:
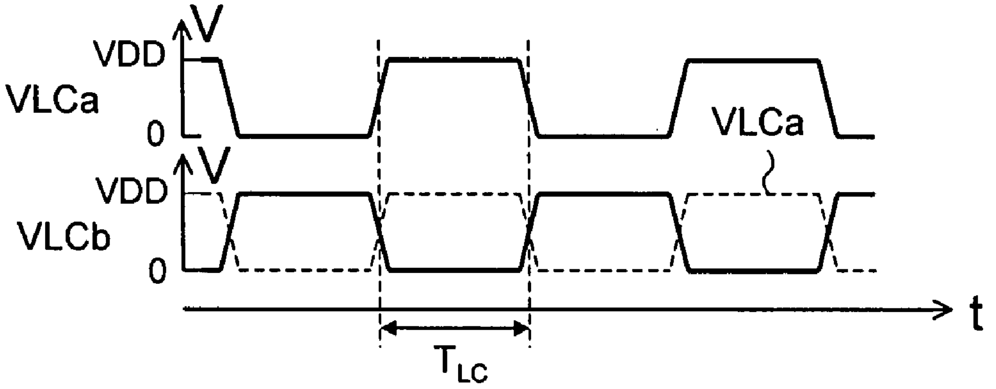
FIG. 9 shows the waveforms of voltages VLCa and VLCb, which are output from the buffer amplifier.

FIG. 9 shows the waveforms of voltages VLCa and VLCb, which are output from the buffer amplifier 27. Voltages VLCa and VLCb are square waves whose polarity changes at intervals of $T_{LC}$. Voltage VLCb is a signal that is obtained by inverting voltage VLCa. The interval $T_{LC}$, which is determined by the frequency $f_{DIV}$ of an output square wave of the frequency divider circuit 26, is equal to $1/(2\times f_{DIV})$.

Figure 10:
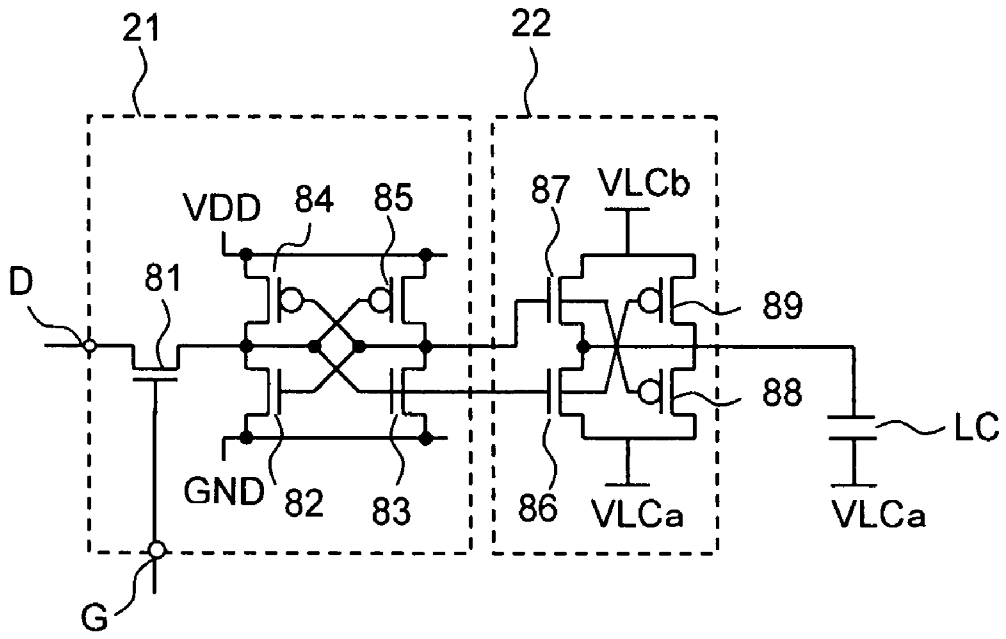
FIG. 10 is a circuit diagram illustrating a static memory and a selector, which constitute a pixel circuit.

FIG. 10 is a circuit diagram illustrating the static memory 21 and selector 22, which constitute each pixel circuit PX. The static memory 21 includes an n-channel TFT 81 for latching data line data, and n-channel TFTs 82, 83 and p-channel TFTs 84, 85, which constitute a memory main body. The selector 22 includes n-channel TFTs 86, 87 and p-channel TFTs 88, 89.

During the image rewrite period $T_{RW}$, the moment a scanning pulse is supplied to terminal G, which is connected to a gate line, TFT 81 turns ON, and the status of the memory, which is composed of TFTs 82 to 85, is updated in accordance with a binary digital image signal that is input to terminal D to which a data line is connected. During the still picture display period $T_{DISP}$, either a pair of TFTs 86 and 88 or a pair of TFTs 87 and 89 turn ON depending on the status of the memory that is composed of TFTs 82 to 85.

When TFTs 86 and 88 are ON, the same voltage waveform VLCa is supplied to the electrodes at both ends of the liquid-crystal element LC. Therefore, the AC voltage applied to the liquid-crystal element LC is 0 V. Thus, the liquid-crystal element LC produces a white visible spot. When, on the other hand, TFTs 87 and 89 are ON, voltage waveforms VLCa and VLCb, which are in opposite phase to each other, are supplied to the electrodes at both ends of the liquid-crystal element LC. Therefore, the AC voltage applied to the liquid-crystal element LC is VDD. Thus, the liquid-crystal element LC produces a black visible spot.

The embodiment shown in FIG. 1 is described as a liquid-crystal display that displays an image by using optical characteristics of a liquid-crystal material. However, the present invention can also be applied to an image display device that displays an image by using optical characteristics of a material other than the liquid-crystal material. Further, the pixel circuits and drive circuit shown in FIG. 2 can also drive a self-luminous display that is obtained by forming a light-emitting element on a substrate.

Figure 11:
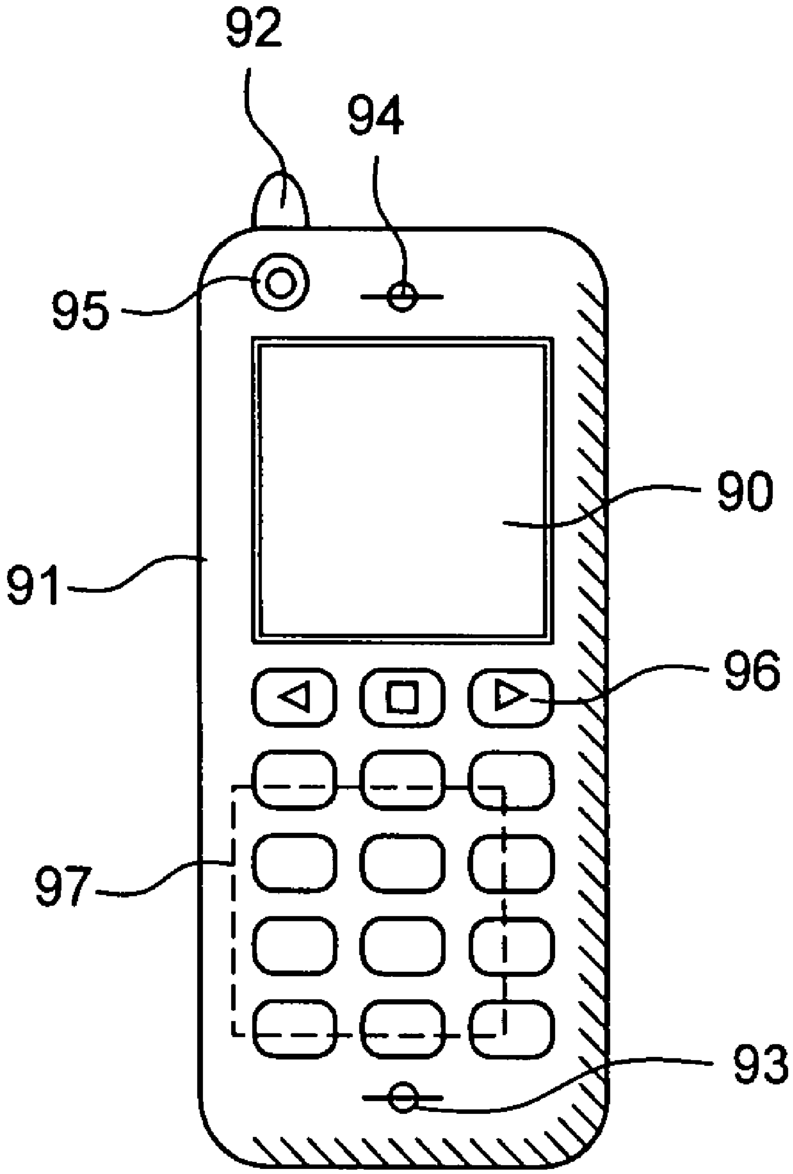
FIG. 11 shows a mobile electronic device to which an embodiment of the present invention is applied.
Figure 12:
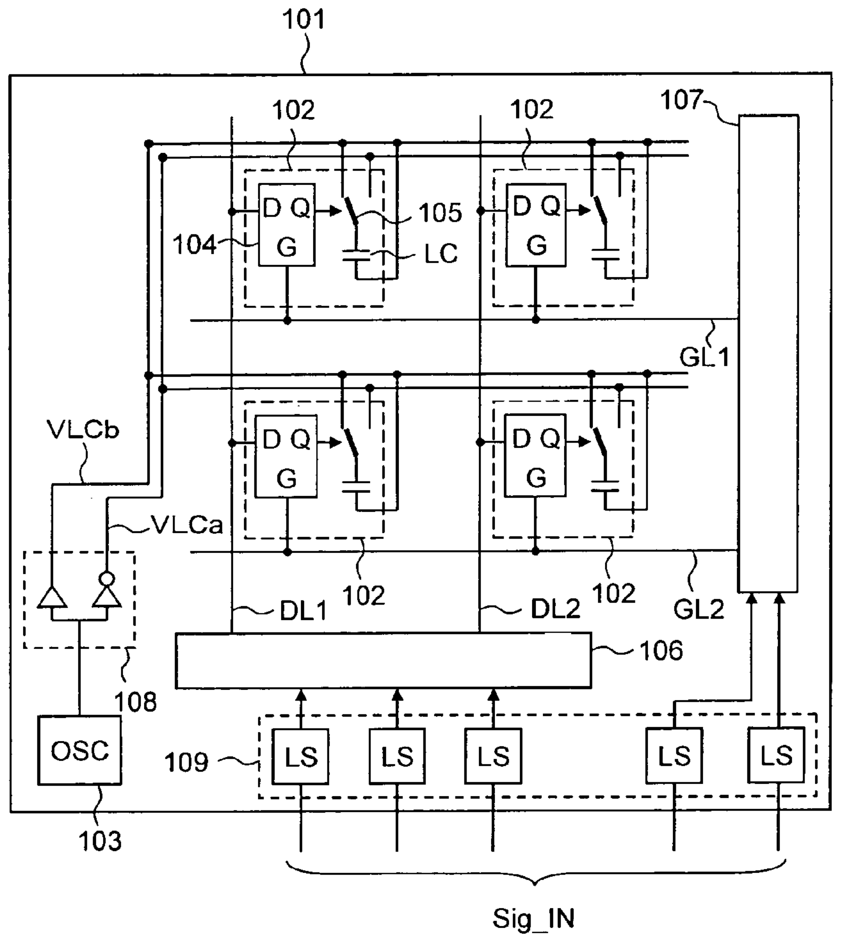
FIG.12 Prior Art
FIG. 12 shows the configuration of a conventional display having a built-in memory.
Figure 13:
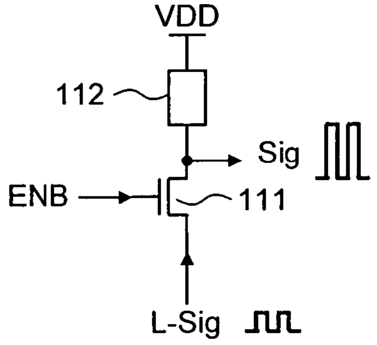
FIG. 13 shows a level shifter having a shutdown function.
Figure 14:
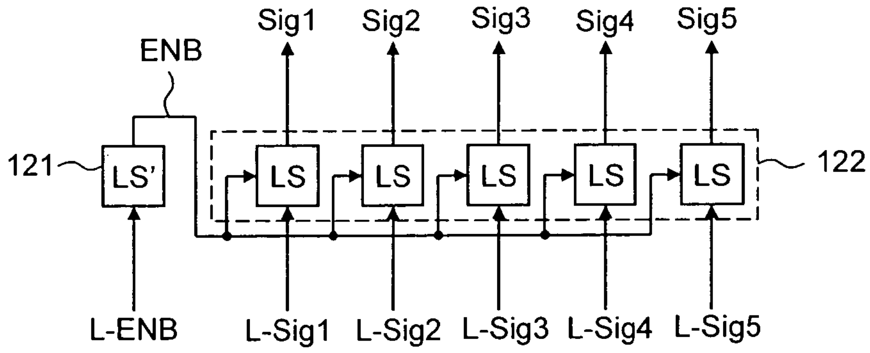
Prior Art FIG.14
FIG. 14 shows a conventional circuit configuration of a group of hierarchical level shifters.
Figure 15:
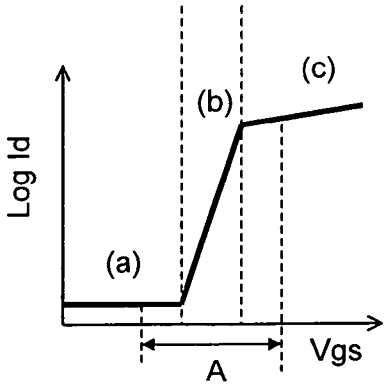
FIG. 15 is a schematic diagram that illustrates the relationship between the gate voltage and drain current of a TFT.

FIG. 11 shows a mobile electronic device to which an embodiment of the present invention is applied. The mobile electronic device 91 includes an antenna 92, a microphone 93, a speaker 94, an image pickup device 95, and an audio playback button 96 in addition to an image display device 90 according to the present invention. The mobile electronic device 91 also includes a battery 97, which supplies power. The image display device 90 according to the present invention can reduce the power for the level shifter circuit while a still picture is displayed. This makes it possible to increase the operating time of the battery 97 by reducing the power consumption of the mobile electronic device 91 or reduce the size of the mobile electronic device 91 by downsizing the battery 97.

The employed reference numerals are as follows:

1, 11: Glass substrate
2: Drive circuit
3: Film substrate
4: Display electrode
5: Connection terminal
12: Transparent electrode
13: Opening
14: Polarization film
15: Retardation film
21: Static memory
22: Selector
25: Oscillator circuit
26: Frequency divider circuit
27: Buffer amplifier
30: Level shifter circuit
31, 32: Shift register circuit
33: Sampling circuit
34: Group of level shifters
35: Level shifter
36: Latch (negative edge type D flip-flop)
37: Level shifter
41: TFT
42: Resistive wiring
43: Inverter
45, 46: Resistive wiring
47, 48: Inverter
51, 52: Positive edge type D flip-flop
61-66: Inverter
67: AND gate
71: Divide-by-two circuit
72: Negative edge type D flip-flop
73: Inverter
74: Selector
75: Buffer
76: Inverter
81-89: TFT
90: Image display device
91: Mobile electronic device
92: Antenna
93: Microphone
94: Speaker
95: Image pickup device
96: Audio playback button
97: Battery
101: Glass substrate
102: Pixel circuit
103: Oscillator circuit
104: Static memory
105: Selector
106: Data driver
107: Gate driver
108: Buffer amplifier
109: Level shifter
111: TFT
112: Load resistor
121: Level shifter
122: Group of level shifters
GL1-GL2, g1-g3: Gate line
DL1-DL2, d1-d3: Data line
LC: Liquid-crystal element
PX: Pixel circuit

What is claimed is:

1. An image display device that includes a plurality of pixel circuits, which are mounted on a substrate, formed with a thin-film transistor, and arranged in a matrix form; a plurality of data lines, which transmit an image signal to the plurality of pixel circuits; a plurality of gate lines, which intersect with the data lines and transmit a scanning pulse to the plurality of pixel circuits; and a drive circuit, which drives the data lines and the gate lines, the image display device comprising:

an oscillator circuit that independently oscillates without an external synchronization signal and is formed with a thin-film transistor on the substrate; and a plurality of level shifters that are formed with a thin-film transistor;

wherein the plurality of level shifters each have a shutdown function for reducing the power consumption of the level shifters;

wherein the plurality of level shifters include a first level shifter and a group of second level shifters;

wherein the shutdown function of the first level shifter is controlled by an output pulse of the oscillator circuit; and wherein the shutdown function of each second level shifter of the group of second level shifters is controlled by an output signal of the first level shifter.

2. The image display device according to claim 1, further comprising:

a frequency divider circuit that is mounted on the substrate and formed with a thin-film transistor to frequency-divide the output pulse of the oscillator circuit, wherein the frequency divider circuit supplies to the pixel circuits a plurality of AC voltages having a period that is an integer multiple of a period of the output pulse of the oscillator circuit.

3. The image display device according to claim 2, wherein the frequency divider circuit includes a plurality of divide-by-two circuits and a selector circuit, and wherein the period of the plurality of AC voltages that the frequency divider circuit supplies to the pixel circuits is obtained by multiplying the period of the output pulse of the oscillator circuit by a power of two.

4. The image display device according to claim 1, wherein a liquid-crystal material is sandwiched between a pair of substrates that includes the substrate and a transparent substrate; and wherein, when a voltage is applied to the liquid-crystal material, the plurality of pixel circuits control an amount of light that is reflected from the pair of substrates or an amount of light that is transmitted through the pair of substrates.

5. The image display device according to claim 4, wherein each pixel circuit includes a static memory having a storage capacity of at least 1 bit, selects one of the plurality of AC voltages to be supplied to the static memory in accordance with a stored logic state, and applies the selected AC voltage to the liquid-crystal material.

6. The image display device according to claim 1, wherein the first level shifter and the group of second level shifters voltage-amplify an externally supplied low-voltage signal to a high-voltage signal.

7. The image display device according to claim 1, further comprising:

a latch circuit that latches the output signal of the first level shifter in accordance with the output pulse of the oscillator circuit, wherein the shutdown function of each second level shifter of the group of second level shifters is controlled by the output signal of the first level shifter via an output from the latch circuit providing the output signal of the first level shifter upon the output signal of the first level shifter being latched by the latch circuit.

8. The image display device according to claim 7, wherein the drive circuit is controlled by output signals of the group of second level shifters.

9. The image display device according to claim 7, further comprising:

a third level shifter that attenuates the output from the latch circuit to an attenuated signal having a lower-voltage amplitude and outputs the attenuated signal from the image display device.

10. The image display device according to claim 1, wherein each level shifter of the first level shifter and the group of second level shifters includes a grounded-gate amplifier circuit, which includes at least one thin-film transistor and at least one resistive wiring; and wherein a drain current of the thin-film transistor of the grounded-gate amplifier of each level shifter is limited by controlling a gate electrode voltage of the thin-film transistor.

* * * * *